Dec. 22, 1970   R. ROMI   3,548,693
TOOL POSITIONING AND POSITION INDICATING APPARATUS
Filed Nov. 1, 1967   7 Sheets-Sheet 1

A-A

INVENTOR:
Romeu Romi
BY Michael S. Striker
Attorney

Dec. 22, 1970 R. ROMI 3,548,693
TOOL POSITIONING AND POSITION INDICATING APPARATUS
Filed Nov. 1, 1967 7 Sheets-Sheet 6

E-E

INVENTOR:
BY

United States Patent Office 3,548,693
Patented Dec. 22, 1970

3,548,693
TOOL POSITIONING AND POSITION
INDICATING APPARATUS
Romeu Romi, Sao Paulo, Brazil, assignor to Industrias
Romi S.A., Sao Paulo, Brazil, a corporation of Brazil
Filed Nov. 1, 1967, Ser. No. 679,698
Claims priority, application Brazil, Nov. 16, 1966,
184,575
Int. Cl. B23b 21/00
U.S. Cl. 82—24                                    13 Claims

ABSTRACT OF THE DISCLOSURE

The cross slide of a lathe is moved with the tool between advanced and retracted positions toward and away from a main axis at a low speed or high speed by operation of first or second manually operated means. A decimal counter indicates the units of the distance travelled by the tool, and a fractional indicator means simultaneously indicated fractions of the unit.

This invention relates to an apparatus for pre-positioning lathe tool holders, and more particaularly to a zero reference positioning means for lathe tool holders which are combined with direct reading diameter indicators.

According to the present invention there is provided apparatus for pre-positioning lathe tool holders in which the means for controlling the position of the cross slide and attached tool holder starting from a zero setting of its tool holder are arranged to operate counter mechanism providing a visual display of cross slide and tool movement relative to the lathe geometric axis in terms of a chosen unit of linear measurement and a further indicator providing a visual indication of fractions of said chosen unit of linear measurement.

According to a feature of the invention there is provided apparatus which, when the main gear assembly will cause the displacement of the cross slide by actuation of two groups of gears, one arranged to operate a revolution counter having a digital readout device operably connected therewith to indicate in unit of linear measurement the travel of the cross slide, the other arranged to operate a wheel or drum having a finely graduated periphery to indicate fractions of the smallest digit of the unit displayed by the readout device.

The lathe tool holders are positioned by the steps of determining the geometric axis of the lathe main spindle through a geometric axis determining device; setting by means of a detent a first gauge attached to said geometric axis determining device, the pointer thereof being set at zero for subsequent settings; adjusting to the tool holder a master bar; advancing said tool post and said master bar so that one end thereof touches a sensitive knob of the first gauge already set; applying a tool zero setting device on the upper face of the cross slide, a second gauge on which being set as the sensitive knob thereof touches said master bar end; substituting a tool for the master bar in the tool post and setting such tool at the same overhang already determined for the master bar; applying to a platform in the tool zero setting device a tool height fixing means and fixing the tool height fixing means for subsequent settings of the tool; setting the readout and drum indicators at zero; withdrawing the cross slide and attached tool holder, setting up the workpiece; advancing the cross slide and the tool on the workpiece until said workpiece has a predetermined diameter as observed from the reading at the readout and drum indicators.

Axis determination means are provided to determine in a lathe the main spindle's geometric axis, both in the vertical and in the horizontal planes, said means to be used whenever a recheck of the position of the geometric axis is desired.

Again there is provided a means to determine the height at which the cutting edge of the tool must be adjusted which means includes a locking element to hold said means in a set position wherein it services as a reference for subsequent resetting of the tool height.

A setting master bar is also provided for a zero setting of the digital readout, of the graduated drum and of the master bar overhang in relation to the geometric axis of the machine main spindle, said means serving as a reference for the cutting tool to be applied to a tool post on a normal turning operation.

The ratio of high-precision gearing incorporated in the lathe is selected as a function of the pitch of the cross feed screw threads, so that a graduated drum solidly assembled with transmission means will make possible final and precise fractional readings say in thousandths of a millimeter or in ten-thousandths of an inch, said indications in millimeters or in inches being readily identifiable by the operator.

The tool direct setting means is provided in connection with the above mentioned indicating means, by which a quick setting of the values corresponding to the diameter or width of the work-piece is effected, said means assuring further a precise setting of the micrometric indicating elements in the operative position, so that reading errors are prevented.

According to a feature of the invention apparatus is provided for positioning lathe tool holders in which a preloaded ball screw with circulating ball means is provided to prevent backlash between the elements causing cross feeding of the holders for cutting tools.

According to another feature of the invention, an apparatus for positioning lathe tool holders is provided with axial thrust means for preventing a cam action of cross feed means rendering the same axially immovable so as not to interfere by importing motion to cross feed means during each revolution of the cross feed screw.

Thus for a given setting of the tool the overhang of the tool, i.e. the extension which projects from the tool post, measured between the tool post and the cutting edge is permanent. Means are arranged to enlarge the overhang of the tool relative to the tool post by the application of shims or the like between the basis of the tool zero setting device and a shoulder provided in a portion of the cross slide rest upper surface.

An embodiment of the invention will now be described by way of example and with reference to the accompanying drawings in which.

Figure 1:
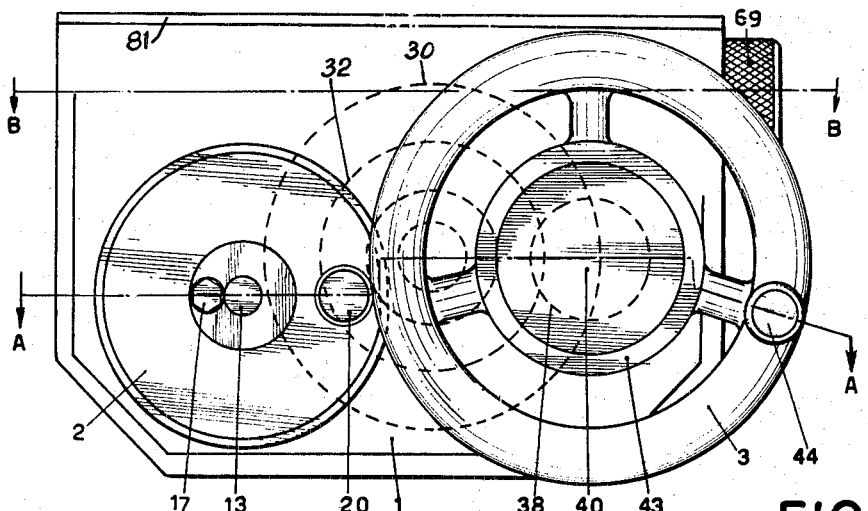
FIG. 1 is a front elevation of the apparatus embodying the invention.
Figure 2:
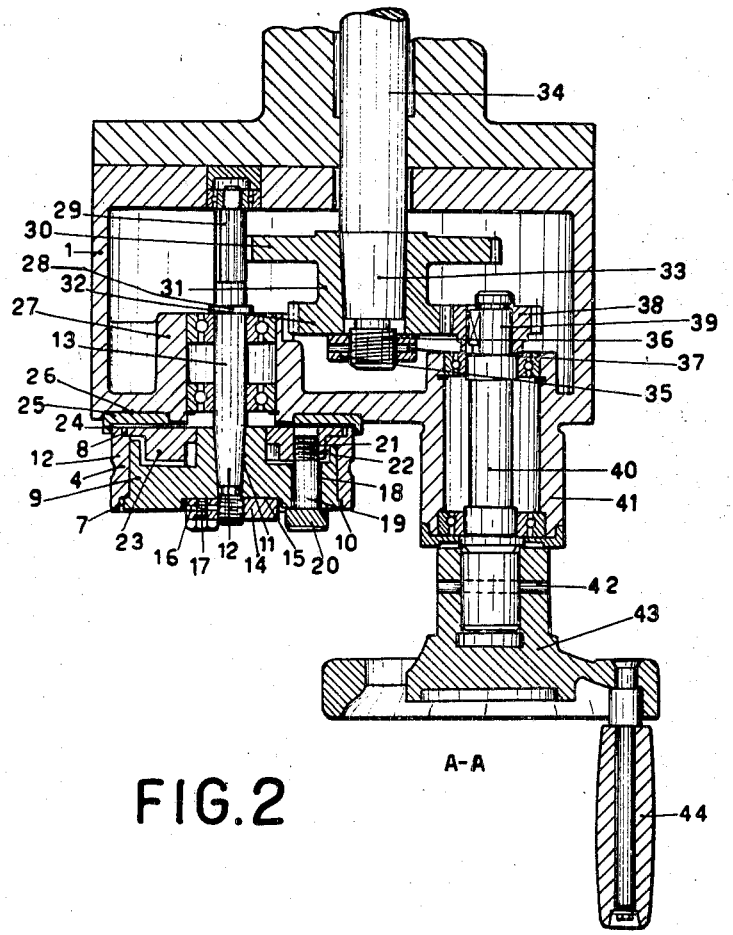
FIG. 2 is a sectional view taken on the line A—A of FIG. 1.

Referring to the drawings a housing 1, FIGS. 1, 2, has a front wall from which projects a fractional graduation drum 2, as well as a flywheel 3, the first one used to govern the idle feeding and the second to control rapid feeding of the cutting tool.

The housing is firmly secured to the front of the cross slide-rest in a lathe which embodies this invention.

The fractional graduation drum 2 comprises an outer ring 4, on the rear portion of the periphery of which are engraved the fractional graduations 5 (FIG. 3) the use of which will be explained in detail hereinafter. On the front portions of said outer ring 4 are carved knurls 6 to guarantee secure gripping of the idle feed control. In the inner face of said outer ring 4 shoulders 7, 8 are provided through which it is secured to a central annular support 9, which is formed with an annular rim 10, tightened against said shoulder 7. The central annular support 9 is centrally drilled with a conical bore 11 to which is closely adapted the taper end 12 of slow feed control shaft 13, which is threaded at its outer end and has a lock nut 14 screwed thereon fitting closely in a round recess 15 milled in the middle portion of said central annular support 9, the lock nut 14 being provided with a split 16. A screw 17 is screwed in the threads cut in a bore transversely drilled in the legs formed by said split 15, which serves the purpose of locking said nut 14 as well as the central annular support 9 relative to the idle feed control shaft 13.

In a bore 18 laterally drilled in said support 9 is fitted a bolt 19, the outer end of which is provided with a knurled head 20, and the inner end with threads 21 which screw in threads out in a perforation 22, bored in a lock ring 23.

The assembly of the outer ring 4, the central annular support 9 and the lock ring 23 may rotate guided by a projecting rim 24 provided in a support disk 25 fitted into a round recess 26 provided in the front wall of housing 1.

A set of ball bearings mounted in a cylindrical member 27, formed in the front wall of housing 1, will support the smooth rotary movement of idle feed control shaft 13, which in the middle portion is provided with a circular ring 28 in contact with inner ball bearing in order that said idle feed control shaft 13 be prevented from any axial shifting.

Figure 7:
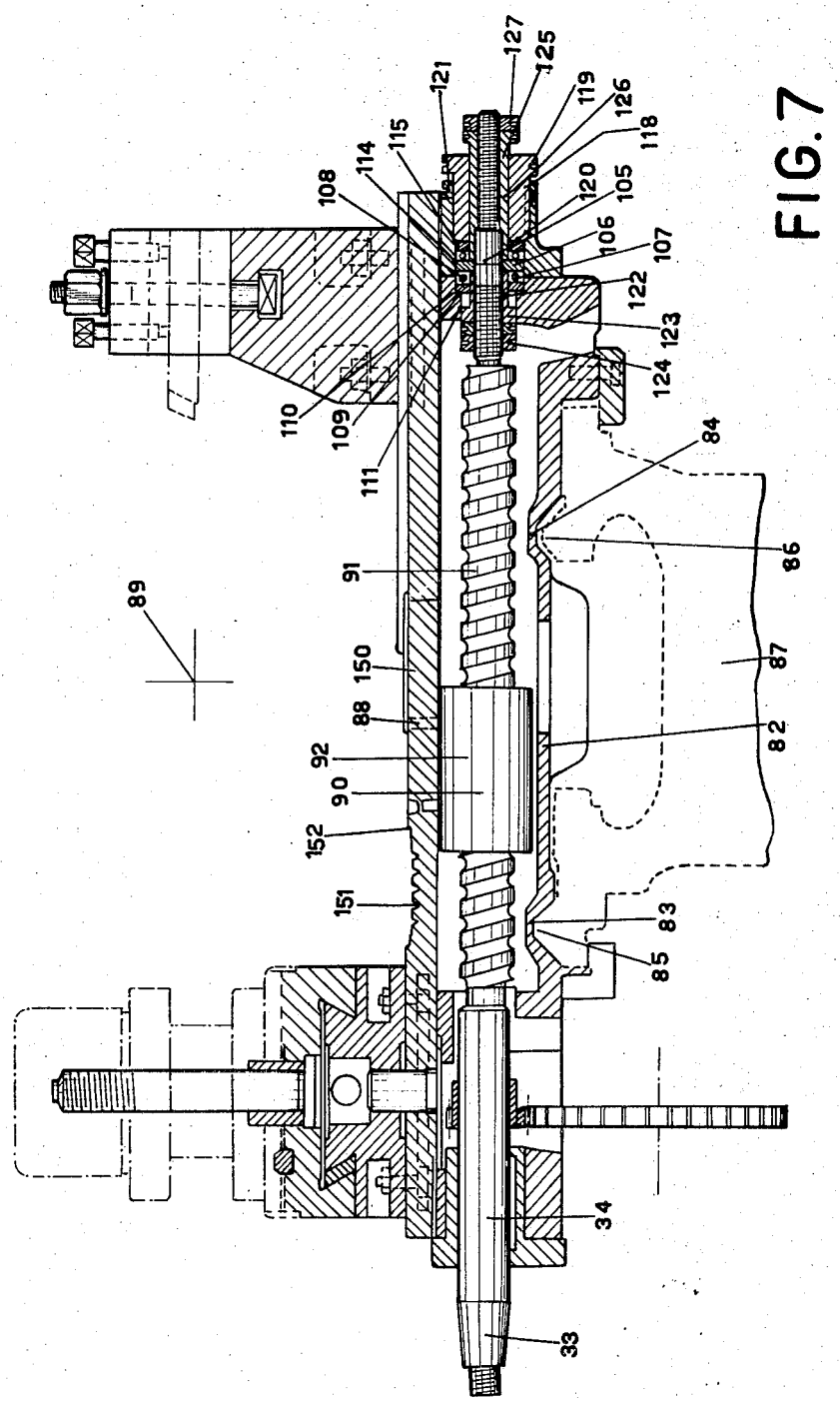
FIG. 7 is a sectional view taken along the cross feed screw of the lathe.

The inner end of the slow feed control shaft 13 is provided with indentations 29 which engage the teeth of a spur gear 30 mounted on a hub 31 also integrally formed with a spur gear 32 and in the conical inner portion of which is closely fitted the taper end 33 of a cross feed screw 34 see FIGS. 2 and 7. The hub 31 is locked against axial displacement relative to the cross feed screw 34 by means of a lock nut 35 which can screw on threads 36 cut in the outer end of the cross feed screw 34 and which is secured by a pin 37 fitting into aligned bores in the lock nut 35 and in the outer end of the cross feed screw 34.

The second spur gear 32 mounted on the outer end of the hub 31 permanently engages a spur gear 38 keyed in the end 39 of a rapid feed control shaft 40, which rotates in a set of ball bearings mounted in a cylindrical member 41, provided in the front wall of housing 1. By means of a pin 42 the rapid feed control shaft 40 is secured firmly to the hub 43 of the flywheel 3 which is provided with a handle 44 through which the flywheel 3 is turned.

Figure 3:
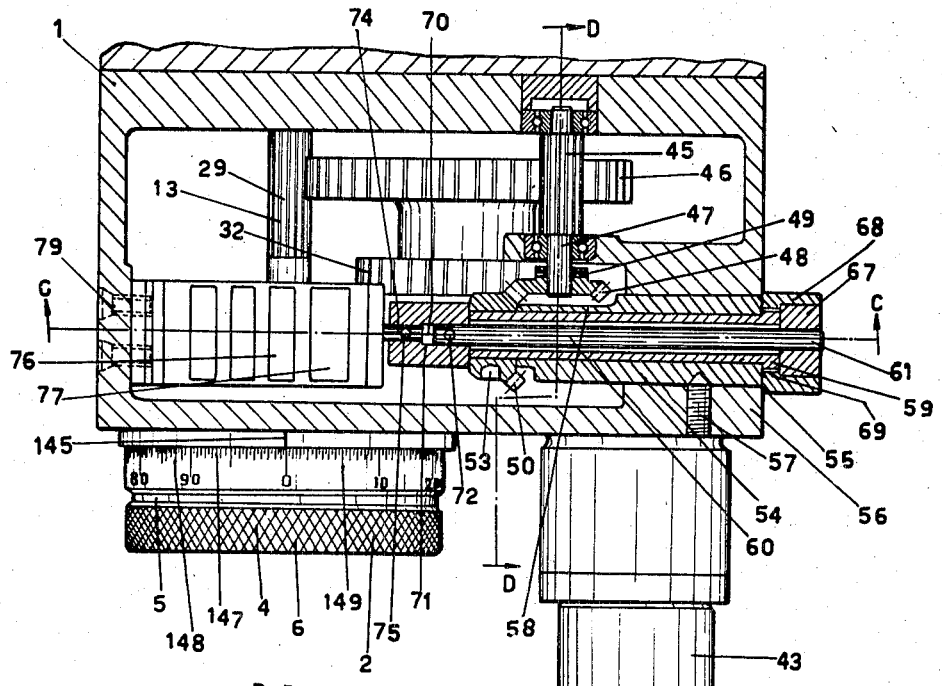
FIG. 3 is a sectional view taken through the line B—B of FIG. 1.
Figure 5:
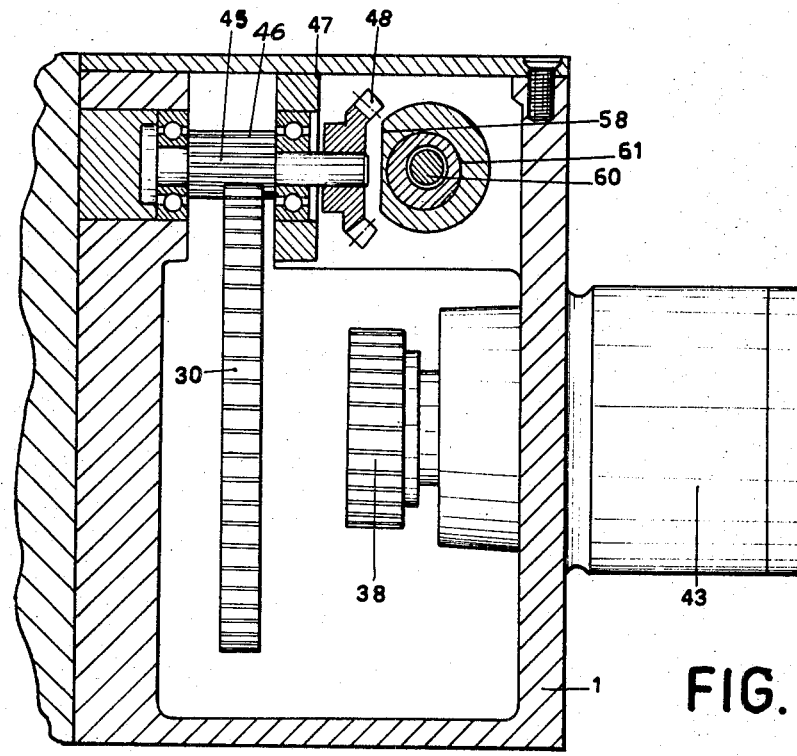
FIG. 5 is a sectional view across the line D—D of FIG. 3.

The spur gear 30 engages teeth 45 provided in an intermediate shaft 46 rotating in ball bearings, see FIGS. 3 and 5.

Figure 4:
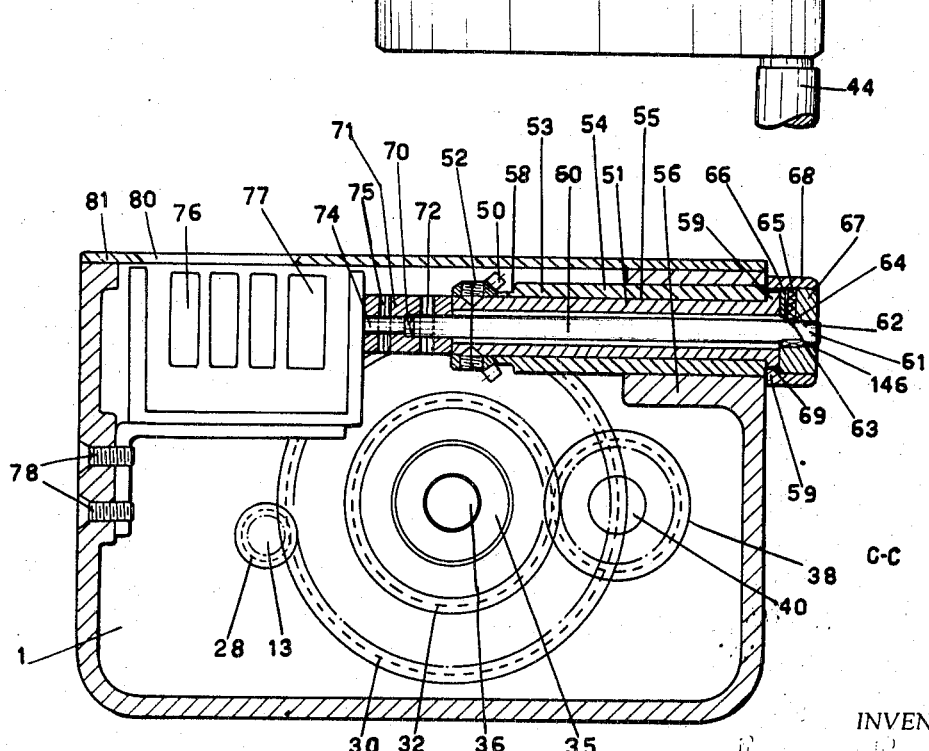
FIG. 4 is a sectional view taken through the line C—C of FIG. 3.

The shaft 46 has at one end 47 a bevel gear 48 firmly secured by a pin 49 and engaging a second bevel gear 50 which is anchored to an outer transversely placed shaft 51 (FIG. 4) by means of set screws 52 locked by a set ring 53. The outer shaft 51 is supported by a bushing 54, which is firmly fitted in a bore 55 disposed in a member 56, and locked against axial displacement by means of a screw 57, and by the chamfered inner end 58 abutting the front face of hub of the bevel gear 50.

The shaft 51 has a flange 59 abutting the lateral wall of housing 1. The outer shaft 51 receives a concentric actuating shaft 60 which is provided in the outer end 61 with indentations 62, 63 which may be selectively entered by a ball 64 resiliently engaged by a spring 65 arranged in a cavity 66 radially drilled in a disc 67. The disc 67 is firmly secured to a knurled knob 68, which is formed with an inside flange 69, the inner periphery of which is provided with serrations arranged to engage selectively serrations provided in the periphery of the flange 59 of outer shaft 51. At the inner end of the shaft 60 lies a bore 70 drilled in connecting sleeve 71 to which it is secured by means of a pin 72. In the other end of the bore 70, an end 73 of a shaft 74 is inlaid and firmly secured by means of a pin 75.

The above-mentioned shaft 74 is a part of a digital and ordinal indicating counter 76 which is provided with a dummy wheel 77, the tenth rotation of which will change a character in the first order wheel of the digital indicating counter 76. The digital indicating counter 76 is supported by a platform 79 secured to the wall of the housing 1 by means of screws 79. The readings of the digital indicating counter 76 may be observed through a magnifying lens fitted to an aperture 80 provided in the cover 81 of the housing 1.

The cross feed screw 34 crosses the length of the slide 82 of the lathe. In the middle portion (FIG. 7), the slide 82 is provided with slots 83, 84 arranged at the lower surface thereof, where it is supported slidably by prismatic guide-rails 85, 86, provided at the upper surface of the machine bed 87. The turning movements of cross feed screws 34, by means mounting in the apron of the lathe, cause the cross slide 88, when the wheel 3 is rotated, the travel rapidly in a precise feed movement as directed by the fractional graduation drum 2.

To excute the cross feed movements, cross slide 88 will travel to and from relative to the geometric axis of the lathe guided by means provided in the slide 82. The geometric axis is indicated in FIG. 7 by the numeral 89 for the purpose of a clearer understanding of this explanation. The cross feed movements are derived from a cross-slide lead nut 90 (FIGS. 6 and 7) which travels along the crossfeed screw guided in a channel cut in the slide 82, and is secured to cross slide 88.

Figure 6:
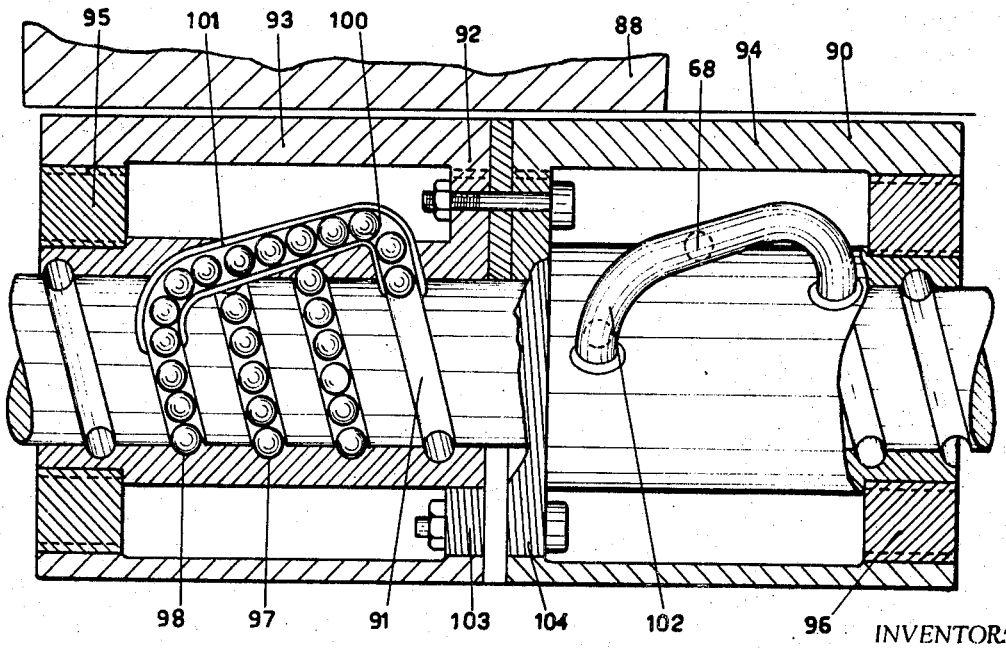
FIG. 6 is an enlarged cutaway view of a preloaded type cross feed screw with recirculating balls.

To eliminate the play between the cross-feed screw 34 and the nut 90 causing the shifting of cross slide 88, in order that measurements be obtained with the smallest error, the cross-feed screw 34 is formed in its middle portion with a helical thread groove 91 whose cross section is semi-circular, whereon can slide smoothly the nut 90 by means of a recirculating ball bearing 92 (FIG. 6), the ball bearing 92 comprising a left sleeve 93 and a right sleeve 94. The left sleeve 93 has a neck at the outer end, to which is threaded a collar 95, peripherally provided with threads to be screwed in the inner threads of the cross slide nut 90. The right sleeve 94 similarly comprises a neck at the outer end, to which is fitted a set collar 96 peripherally provided with outer threads screwed in the inner threads of the cross slide leading nut 90. The left sleeve 93 and the right sleeve 94 are provided internally with a helical thread groove 97 whose cross section is semi-circular, and which forms with thread groove 91 a helical channel having a circular cross section. In the channel thus formed balls 98 for the left hub 93, and the balls 99 for the right hub 94 are free to circulate. As seen in FIG. 6 balls 99 are held during the rotation of the cross feed screw 34 by a guide 100 and enter the left hand connecting tube 101, which together with the right hand connecting tube 102 extending helically in a contrary sense, cause then circulate collected from one portion of the channel and discharged in a forward portion of said channel.

At the inner end, the left and right sleeves 93, 94 are fastened together by flanges 103, 104 which are threaded in the periphery to be screwed in the threads cut in the middle portion of the tubular part of the cross slide nut 90. The space formed between the flanges 103, 104 may be filled up with sealing rings 90a of felt or suitable material to allow a true adjustment between the respective sleeves 93, 94 by means of bolts and nuts 90b.

The cross feed screw 34 must work with absolute axial precision, not allowing the least cam action, so as not to interfere by adding or subtracting movement on the cross slide means for each and every full revolution of the cross feed screw 34. To accomplish this precision, a set of adjusting nuts is applied to an assembly of self-centering ball bearings 107 and 108. At the smooth middle portion 105 (FIGS. 7, 8) of the slender part in the end portion of cross feed screw 34, a carrier ring 106 is fitted with the minimum of bore tolerance. The carrier ring 106 serves as a central support for the left ball bearing 107 and the right ball bearing 108.

An outer flat face 109 of a left centering ring 110 placed at the outer left hand of the bearing 107, fits into a recess 111, cut near the upper portion of rear wall of the slide-rest 82.

The left centering ring 110 is provided with a concave inner face 112, and the cap of the left ball bearing 107 has a convex face 113 having the same radius of curvature in order to allow the sliding of those surfaces on each other when centering is effected.

Equally the right ball bearing 108 is centered by means of the right centering ring 114 comprising an outer flat face 115 and a concave inner face 116 with the same radius of curvature as that of a convex face 117 of the cap of the right ball bearing 108.

Figure 8:
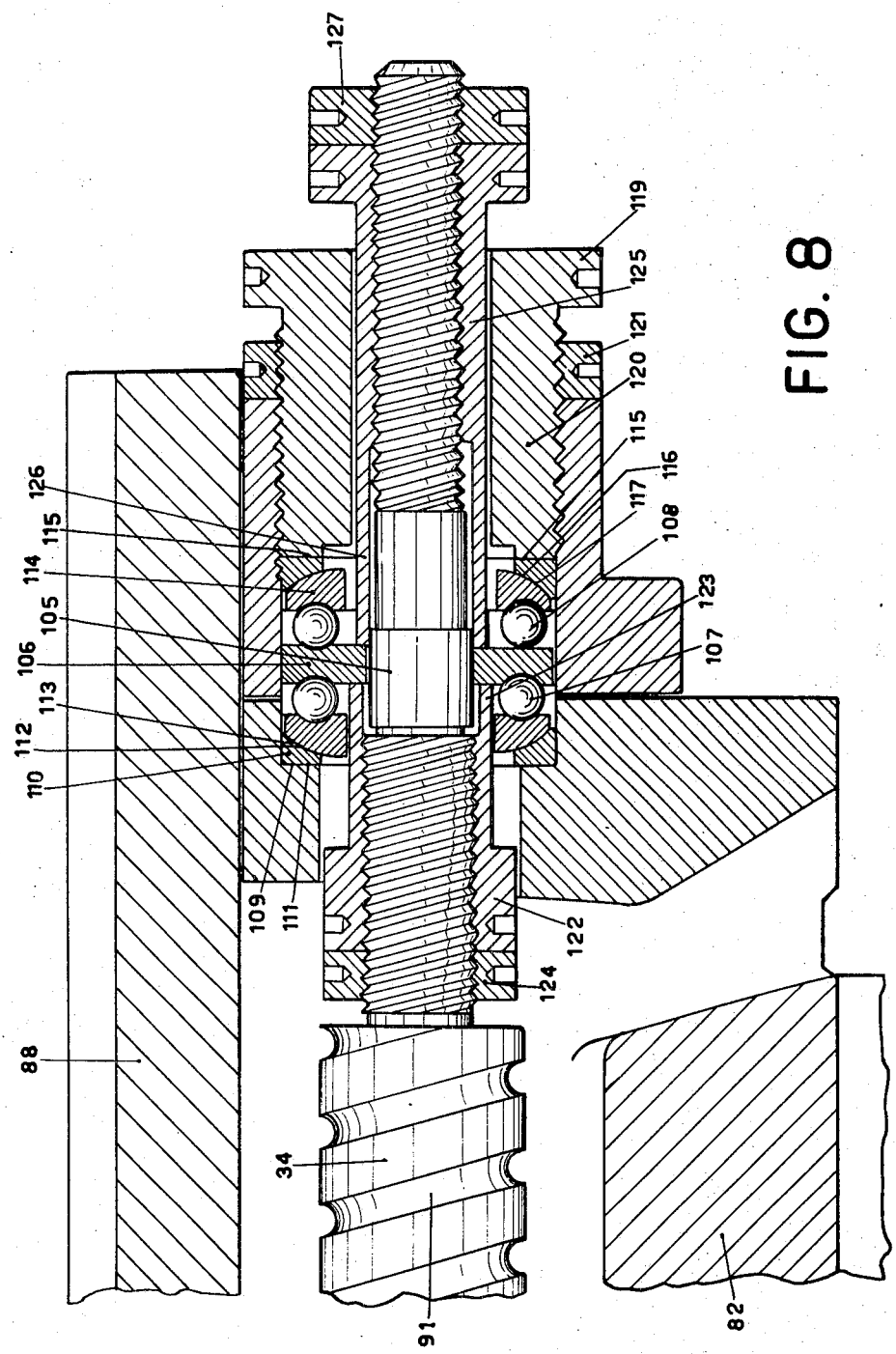
FIG. 8 is an enlarged cutaway view of an axial thrust preventing means for making the cross feed screw stable.
Figure 9:
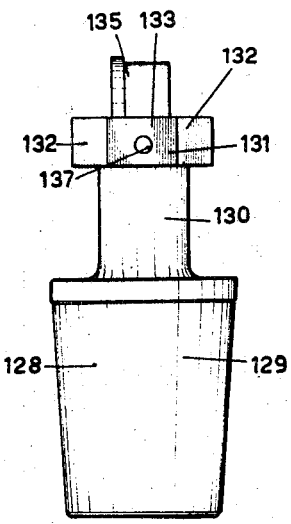
FIG. 9 is a front elevation of a device for locating the geometric axis of a lathe's main spindle.

This bearing assembly is centered by slipping the mating surfaces through tightening, for instance, a clasp nut 118 FIG. 8 which is screwed by the peripheral threads in threads internally existing in the rear wall of the slide-rest 82. The clasp nut 118 is tightened by driving holes drilled in the periphery of a terminal flange 119, and with its inner end 120 presses against the outer flat face 115 of the right centering ring 114 in order that the concave face 116 of the cap of the right ball bearing 108 will center this side of the assembly and at the same time adjusts the convex face of the ball bearing cap on the concave face 112 of the left center ring 109, which fits tightly the recess 111.

The clasp nut 118 is locked in place by means of a check nut 121 tightened by a tool inserted into holes to screw along outer threads provided in clasp nut 118.

The carrier ring 106 is centered from the left hand side by means of a clasp nut 122 provided with a medium annular portion length 123, which enters the space existing between the left bearing 107 and the smooth portion 105 of the end of the cross-feed screw 34, and presses against the carrier ring 106. The clasp nut 122 is tightened by means of holes drilled in the periphery of its terminal flange and is locked in place by screwing of a lock nut 124. From the right hand side, the carrier ring 106 is centered by means of a clasp nut 125, whose long tubular end portion 126 projects into the space between the right ball bearing 108 and the smooth portion 105 of the cross-feed screw 34 and presses against the carrier ring 106.

The clasp nut 125 is tightened by means of holes drilled in the periphery of its terminal flange and is locked by means of a check nut 127, tightened through the driving holes.

In the preceding paragraphs were described and numbered the constructive parts of the apparatus of this invention; a description of the operation will now be given. The parts of a lathe which strictly do not concern the indicating counter but are closely related thereto, either because they are related to the devices needed for the zero-setting of the lathe or because they are conventional parts mentioned for clarity, will receive additional numerals as this specification continues and reference to parts not previously mentioned is made.

The precision mounting of cross-feed screw 34 by means of the parts above described being effected, a device capable of determining the geometric axis of the main spindle of a lathe must be provided in order that the cutting hools may have a zero reference from which the turning diameter is measured, that is, the distance between the tool and the geometric axis 89.

FIGS. 9, 10, 11, 12, illustrate a geometric axis determining device 128 by means of which the fixing of the axis or imaginary reference line is obtained. The geometric axis determining device 128 comprises a base 129 formed as a truncated cone, from the major end of which extends a stem 130, the remote end of which forms a half-disc 131. The flat faces 132 of the half-disc 131 coincide with a plane which passes through the center axis of the base 129. In the middle portion between these flat faces 132 a recess 133 is provided, the bottom of which is parallel to the flat faces 132. Radially drilled in the half-disc 131 is a hole into which is fitted a pin 134 of a gauge 135 whose reading is made by means of a pointer 136. The geometric axis of said hole is perpendicular to the geometric axis 89 of the lathe main spindle and lies in the same horizontal plane. On one end of the pin 134 projecting slightly above the bottom wall of the recess 133 an adjustable sensing projection 137 is provided.

Figure 10:
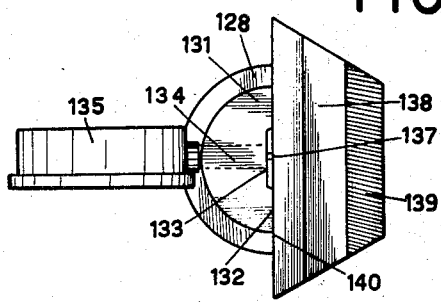
FIG. 10 shows a reference device for the zero setting of a dial provided in the device of FIG. 9
Figure 11:
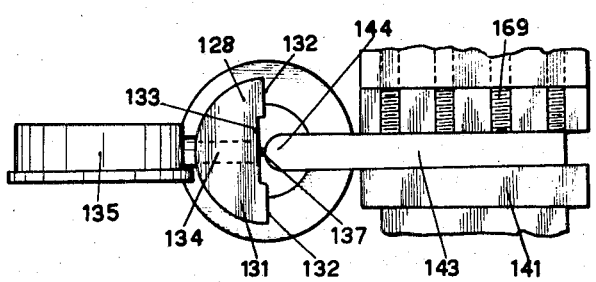
FIG. 11 shows the geometric axis determination device as set by a master bar used to fix the overhang of the tool.

The plane in which the geometric axis 89 lies is determined by a close fitting of the base 129 of the geometric axis determining device 128 to a conical hole in the main spindle (not shown) of the lathe so that the spindle and the base 129 are coaxial. Close to the flat faces 132 a knob detent 138 shown in FIG. 10 is disposed, which comprises a trapezoidal body with a knurled extension 139 to allow a safe use when handled, and a base face 140 absolutely flat which abuts the flat faces 132 of the half-disc 131. The gauge 135 is zeroed with the sensing projection 137 just touching base face 140. Then any contact with said sensing projection 137 will be indicated by pointer 136, whose zero-setting now corresponds to the vertical plane through the geometric axis of the lathe.

Then the tool post 141 on slide 88 (FIGS. 11, 12, 15, 16) must be placed in a position such that the distance from said tool post 141 to the geometric axis 89 of the lathe is rigorously determined which will serve as a reference for the tools fitted in the usual manner to the tool post 141, so that a cross feeding of the tool to remove material from the work-piece is registered in the digital counter 76.

Figure 15:
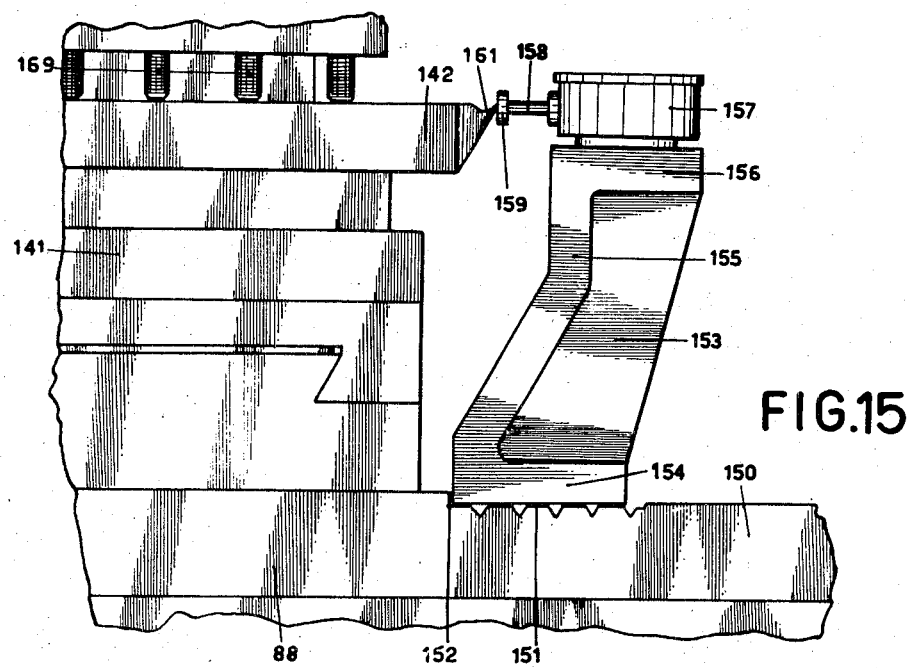
FIG. 15 is a side elevation of the tool zero-setting device.
Figure 16:
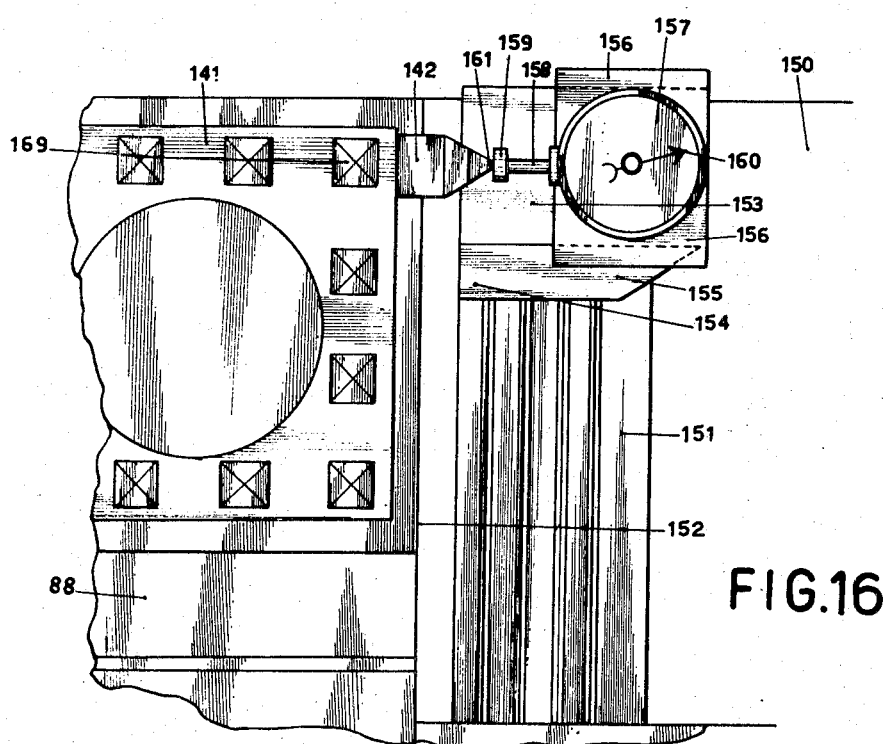
FIG. 16 is a plan view of the tool zero-setting device shown in FIG. 15.

The tool 142 indicated as an example, in FIGS. 15 and 16, must be spaced a certain fixed or measured distance from the zero point selected or from the geometric axis of the lathe main spindle. This distance can be fixed by means of a setting master bar 143 (FIGS. 11, 12) which is fixed in the tool post 141, by means of bolts 169. The end 144 of the setting master bar 143 is positioned so that it just touches the sensing projection 137 of the gauge 135, so that pointer 136 registers with the zero point previously determined.

The operator must then set to zero the indicating elements, that is to say, the fratcional graduated drum 2 and the digital indicating counter 76, the former for the fractional values and the latter for the whole numbers.

The zero setting of the fractional graduation drum 2 is attained by turning the knurled head 20 of the bolt 19, so that the threads 21 are unscrewed from perforation 22 in lock ring 23, loosening the shoulders 7, 8, of outer ring 4, respectively from the annular flange 10 of central annular support 9 and from the lock ring 23. The outer ring 4 is free to be rotated by hand, till the number zero in the graduations 5 registers with an indexing dash 145 (FIG. 3) adequately marked in the periphery of the projecting rim 24 of the support disc 25. Set at zero, the drum 2 is locked again by the driving bolt 19, so that locking ring 4, can only rotate with the rotation of the idle feed control shaft 13.

To zero the digital indicating counter 76, the operator unscrews the knurled knob 68, so that the serrations provided in the inner periphery of the inside flange 69 are disengaged from the serrations provided in the outer periphery of the flange 59, of the outer shaft 51. Since the knurled knob 68 is secured to the disc 67 an outward linear displacement given to the knurled knob 68 is transferred to the disc 67, and the sphere 64 against the spring 65 will get out the recess 63 until reaching the recess 62, in which position the serrations are disengaged from each other. A turning movement of the knurled knob 68 will rotate the shaft 60 by means of the key 146 connecting the shaft 60 to the disc 67, so that the rotary motion, through the pin 72 is transferred to the connecting sleeve 71 and to the end 73 of shaft 74 which is the shaft which actuates the digital counter 76. The characters can thus be set so that zero appears on all the wheels of the counter 76 when viewed through the aperture 80 of housing 1.

The digital counter 76 is locked by pushing the knob 68 toward the housing 1, so that subsequently only through the rotation of the outer shaft 51 will the characters of the digital readout 76 be changed.

After the zero-setting of the indicating devices—digital counter 76 and fractional graduation drum 2—tool post 141 may be drawn back from the geometric axis 89, in order that this distance be registered in the digital counter 76 and the graduations 5 of outer ring 4, so that the tool may be adjusted for operation.

The rapid forward movements and withdrawals are made and the intermediary of the flywheel 3 through its handle 44. The clockwise rotation of the handle will result in forward movement of the tool 142 and counter-clockwise in the withdrawal thereof relative to the geometric axis 89. The movement is transferred through the gear wheel 38 to the gear wheel 32 and thus to the cross-fed screw 34 in a reverse sense. If the rotation of flywheel 3 is clockwise, that of the cross-feed screw 34 will be counter-clockwise. The cross-feed screw rotative motion is transferred to cross slide nut 90 by rolling the spheres 98, 99 into the channels provided into the channels provided in the inner hollow of the cross slide leading nut 90 and in the cross-feed screw 34, so that the cross slide nut 90 is displaced lengthwise carrying the cross slide 88 and the tool post 141 in a feeding movement.

Adjustment to the graduation drum 2 is made through the outer ring 4 locked against the central annular support 9, which is engaged in the conical bore 11 at the tapered end 12 of the idle feed control shaft 13 and locked by means of the lock nut 14, the axial displacement of which is prevented by a screw 17 driven through the split 16. The rotation of the fractional graduation drum 2, will be transferred to the idle feed control shaft 13 and from the spline gears 29 to the spur gear 30, screw 34, and cross slide 88. In this example, the speed ratio between spline gears 29 and spur gear 30 is 1:10 and the pitch of the cross-feed screw 34 is 5 mm. so that each complete revolution of the fractional graduation drum 2 about its axis, corresponds to one tenth of one turn of gear wheel 30, that is to say, an angular movement of 36° or a linear displacement for the cross slide 88 with tool post 141 and tool 142 of one-half millimeter.

Consequently, ten complete revolutions of drum 2 about its own axis are necessary to cause the cross slide 88 a linear displacement of five millimeters, that is a complete revolution of the cross-feed screw 34 about its own axis.

The gearing ratio between the gear wheel 32 and the gear wheel 38 is 2:1. Thus, for instance, as the cross-feed screw 34 has a thread pitch of five millimeters, for each complete revolution of the fly wheel 3 a linear feed of two-dnd-a-half millimeters will result for the cross slide 88, as well as for the tool post 141.

Since the gear wheel 30 engages the teeth 45 in the intermediate shaft 46, the rotation received from the fly-wheel 3 will be transferred also to the bevel gear 48 and to the bevel gear 50, causing rotation of the outer shaft 51 and through the clutching of the serrations, rotation of the actuating shaft 60 through the key 146, the connecting sleeve 71 and the shaft 75 of the digital counter 76. This will alter the indicated characters of the respective register wheels, through the dummy wheel 77, at each ten revolutions received.

Since the ratio between the gear wheel 30 and the teeth 45 is 10:1 each complete revolution of cross-fed screw 34 with the gear wheel 30 effected by the flywheel 3 or by the drum 2, produce ten revolutions of the intermediate shaft 46, and since the ratio between the crown gears 49, 50 is 1:1, the outer shaft 51 and the actuating shaft 60 will rotate the dummy wheel 77 ten times in order that the first wheel will pass from one number to another.

A work-piece is considered by its diameter for its cutting measurements. It is known that the displacement of the tool towards or the retraction of the tool from the geometric axis 89 is linear and amounts to five millimeters for one complete revolution of the gear wheel 30 and the cross-fed screw 34 about their common axis. Thus, departing from the zero indexed in coincidence with the geometric axis 89 already determined the digital counter will register the numeral ten, in consequence of that one reotation that has drawn back the bit of the cutting tool five millimeters in linear displacement. Considering the gearing ratio stated above, the drum 2 and the outer ring 4 starting from the zero indexed, will rotate ten times about their common axis, the numeral zero of graduations 5 indexing again the indexing mark 145 engraved in the projecting rim 24.

The graduations 5 are made with the basic graduations 147 in the circumference of outer ring 4, which amount to two hundred, each one corresponding to the 0.005 mm. on the work-piece diameter, to two and a half microns (0.0025) of linear displacement of the tool post 141. Therefore, considering rotation from one basis graduation 147 to the following, the tool 142 will feed a distance equal to a 2.5 thousandth part of one millimeter, since the cross feed screw 34 has a thread pitch of five millimeters and has received an angular movement which corresponds to the five-thousandths part of one millimeter as a result from the ratio of the engagement of gear wheels 29, 30 is 1:10. Each two basic graduations 147 is indicated by a longer dash 148, and corresponds to 0.01 of one millimeter in the diameter of a work-piece; further, the larger graduations indicated by the long dash 149, in groups of twenty basic divisions, will correspond to 0.1 of one millimeter in the work-piece diameter; one complete revolution of the drum 2 around its axis will correspond to one millimeter in the diameter of work-piece, or one-half millimeter of linear displacement of tool post.

After the determination of the zero-setting of the indicating devices—the drum 2 and the digital counter 76—attention is given to the tool post 141 and the tool 142 needed for the cutting operation. The zero position of the tool post has already been determined by the setting master bar 143. The tool post 141 may be drawn back relative to the geometric axis 89 a given distance which is registered both in the graduations 5 on drum 2 and the digital counter 76.

The tool 142 must project from post 141 for the same distance as does the setting master bar 143. To accomplish this, in the upper surface 150 of cross slide 88 a recess 151 is milled, which is provided with a shoulder 152 perpendicular to the edge of the cross slide 88. The recess 151 is provided with a series of transverse triangular slots to collect dirt and chips which may fall there.

A tool zero setting device 153 (FIGS. 15, 16) has its square base 154 abutting the shoulder 152, so that no gaps will arise between the mating surfaces. From the base 154 rises a column 155, which forms a platform 156 in the upper end where a gauge 157 capable of linear displacement is applied. A stem 158 projects from the gauge 157 and ends in a sensing flange 159. The gauge 157 has a pointer 160 which will give indication of the zero-setting as explained hereinafter.

After the base 154 is positively and closely fitted against shoulder 152, the operator feeds tool post 141 through the means already explained, till the digital counter 76 shows again the zeros co-incident with the geometric axis 89 of the lathe embodying this invention, and previously altered by the retraction of the tool post. In this position the end 144 of the setting master bar 143, which is set already as explained hereinbefore, will merely touch the sensing flange 159 and the operator then zeros the pointer 160.

Figure 13:
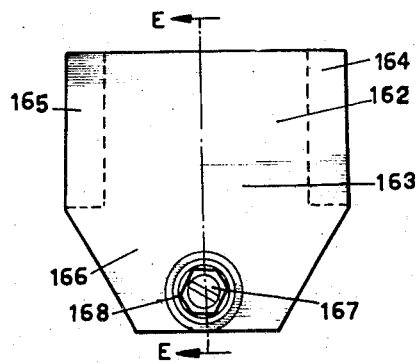
FIG. 13 is a plan view of the tool height fixing device.
Figure 14:
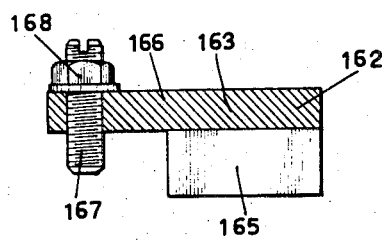
FIG. 14 is a view taken on the line E—E in FIG. 13.
Figure 12:
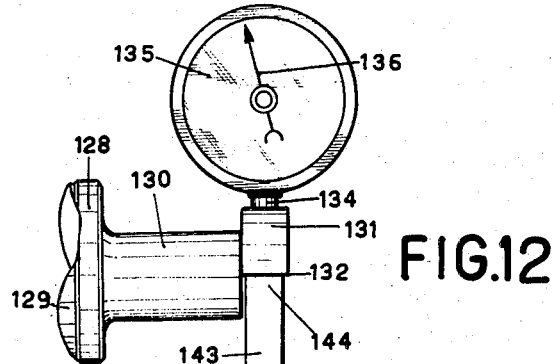
FIG. 12 is a plan view of the assembly shown in FIG. 11 as viewed from the left, as shown in the drawings.

The tool 142 with bit 161 is adjusted at a certain and given height in relation to a horizontal plane passing through the geometric axis 89, which may be effected by rotating through ninety degrees the geometric axis determining device 128, in order that the bit 161 of the tool 142 touches the sensing projection 137 of the gauge 135, now incident on a horizontal plane. In order that the height of the tool bit 161 may be determined for future reference a tool height fixing device 162, see FIGS. 13 and 14 must be employed on the platform 156 of the tool zero-setting device 153, over the gauge 157. This device 162 comprises a plate 163 with downward lateral flaps 164, 165 and a triangular projection 166 in a threaded hole of which is disposed a fine adjusting screw 167 locked by means of a lock nut 168, when touching the tool bit.

The zero-setting of the above mentioned setting master bar 143 will allow that the tool 142 projects a certain distance from the front face of tool post 141. The distance is called the overhang of the tool. This overhang may be enlarged relative to the initial setting of the geometric axis 89, by the insertion of shims between the vertical faces of the base 154 of the tool zero-setting device 153 and the shoulder 152, on the recess 151. Since the readings on the digital counter 76 and the drum 2 correspond always to the required diameter of the work-piece the indicating means must be unlocked and set at zero again for a larger overhang of the tool.

When the tool bit 161 lies exactly on the geometric axis 89 of the lathe the position of the tool may be fixed by means of the bolts 169 to the tool post 141, the tool post 141 being drawn back to provide the necessary space for the fitting of the work-piece in the lathe. The amount of said return is registered in subdivisions of millimeters in drum 2, and in millimeters in the digital counter 76 in correspondence with the counterclockwise manual rotation of flywheel 3, which draws the cross slide 88 away from the geometric axis 89 of the lathe main spindle in the established ratio, that is to say, to each complete turn of flywheel 3 about its axis, crossfeed screw 34 is given an angular displacement of 180° and cross slide 88 travels a linear distance of two-and-a-half millimeters.

This displacement is registered as double this amount, to correspond to increase in the diameter of five millimeters, due to the fact that the gearing for the digital counter 76 is arranged so that during the return of the tool 142 the indicated amount is increased above the original zeros set, and by the feed of the tool the indicated amount is diminished in the registered total.

Thus, to each distance of one millimeter run by the cross slide 88 as drawn back, the digital counter 76 will register, increasing from 000 in steps of one digit, the number corresponding to twice this amount, that is the digit two. To make clearer the explanation a practical example is given in the following: the digital counter 76 increases by two numerals for the first millimeter movement of the cross slide 88; four for the second millimeter; six for the third, and so on, till the travel of the tool is completed by the linear displacement of the cross slide 88, as explained. The odd numbers follow the same ratio, that is, the numeral one for the first one-half millimeter; the numeral three for one millimeter-and-a-half; the numeral five for the two-and-a-half millimeters, etc. To sum up, let it be supposed that at the digital counter 76 appears the numeral two hundred. This means that the tool 142 has been drawn back from the geometric axis linearly, by an amount of one hundred millimeters, which is registered for the adaptation of the work-piece of this example.

The approach of the tool 142 relative to the geometric axis 89, which was obtained by a clockwise rotation of the flywheel 3, will subtract from the numeral 200 in the digital counter, and amount equal to twice the distance in millimeters of the travel of the tool 142 toward the geometric axis.

As a concrete example, let it be supposed that the work-piece blank has a diameter of one hundred and fifty-two millimeters. This diameter will be registered in the digital counter 76 upon the tool bit 161 touching the periphery of the blank. In order to accomplish this, the cross slide 88 must travel a distance of twenty-four millimeters from the position in which the digital counter registers two hundred millimeters. As already stated, counting is made by the diameter. So the travel of the cross slide 88 towards the geometric axis 89 by the amount of twenty-four millimeters will subtract forty-eight units from the numeral two hundred registered previously in the digital readout 76.

Let it be supposed further, that the work-piece is required to have a final diameter of one hundred and ten millimeters. Having in mind such elements as: metal hardness, tool bit, cutting speed and so on the operator calculates the cutting depth of the successive tool passages needed to withdraw a coat of twenty-one millimeters in the radius of the blank, in order that the finished work-piece has a diameter of one hundred and ten millimeters.

Let it be supposed yet that the operator wishes to withdraw from work-piece a further coat of twenty-five thousands of one millimeter, i.e., 0.025 mm., after the final diameter of 110 millimeters is obtained. The operator operates the lathe for the cutting as explained, until the numeral one hundred and ten appears in digital counter 76. The zero-mark of the graduations 5, on the outer ring 4 will register with the indicating mark 145. By an angular motion of outer ring 4, the operator turns drum 2 till the dash corresponding to five graduations 148 registers with the indicating mark 145, resulting in the tool 142 being moved a further distance of 0.025 mm. and a reduction of 0.25 mm. in the radius of the work-piece.

On the other hand the operator wishes to leave a coat of twenty-five thousandths of one millimeter, when the digital readout 76 almost registers the numeral one-hundred-ten, the operator stops the tool feed at the ninety fifth graduation 148 before for the zero registers with indicating mark 145 in projecting rim 24, resulting that in the blank diameter a coat of 0.05 of one millimeter remains prior to the blank being the exact diameter of one-hundred-ten millimeters.

The corresponding change of the graduations 5 on fractionary graduation drum 2 and the sdaptation of digital readout 76, may adjust the device to read in inches.

What I claim is:

1. Tool positioning and position indicating apparatus comprising, in combination, a movable slide; a tool holder and a tool thereon secured to said slide; operating means for moving said slide with said tool between advanced and retracted positions, and including an input means; first and second manually operated means; first rapid traverse and second slow traverse transmission means having different ratios and connecting said input means of said operating means with said first and second manually operated means, respectively, so that the tool can be manually advanced and retracted at different speeds; first indicator means driven from said first manually operated means for indicating distances of tool movement in selected units; and second indicator means for indicating fractions of said unit, and being driven from said second manually operated means, said input means and said first and second indicator means being interconnected for movement together so that the distances travelled by said tool under manual control are indicated in units at said first indicator means and in fractions of the unit at said second indicator means.

2. Apparatus as claimed in claim 1 wherein said input means of said operating means includes a feed screw; wherein said first and second transmissions include gear means mounted on said feed screw; wherein said first indicator means includes a revolution counter having indicator wheels for said units; and wherein said second indicator means includes a drum having graduations on the periphery thereof, and being connected with said second manually operated means.

3. Apparatus as claimed in claim 1 wherein said first indicator means includes a counter having decimal wheels, the wheel of the lowest order being a dummy wheel, and the wheel of the next higher order being an indicator wheel having digital indicia representing said units so that said dummy wheel can be driven at a high speed by said first transmission.

4. Apparatus as claimed in claim 1 in combination with a lathe having a main axis; wherein said slide is a cross slide mounted on said lathe for movement transverse to said main axis; and comprising means for setting said first and second indicator means to zero positions when said tool is located in said main axis in said advanced position.

5. Apparatus as claimed in claim 4 wherein said tool holder includes a tool post and a master bar mounted on the same adjustably transversely to said axis; and comprising a zero setting means including a gauge having an operative position located in said main axis and engaged by said master bar for determining a zero position of the same and of said tool holder whereby said tool can be placed in a corresponding advanced position with the extremity thereof located in said main axis.

6. Apparatus as claimed in claim 5 wherein said zero setting means includes a base with a guide edge mounted on said cross slide; wherein said cross slide has a recess bounded by a guide shoulder, said base being located in said recess abutting with said guide edge said guide shoulder; wherein said gauge is mounted on said base so that said tool can be set to a predetermined overhang by said gauge after determination of said overhung by said master bar.

7. Apparatus as claimed in claim 6 wherein for a predetermined setting of said master bar in said zero position, said tool projects a predetermined constant overhang distance.

8. Apparatus as claimed in claim 6 wherein said gauge indicates zero when engaged by said extremity of said tool in said advanced position.

9. Apparatus as claimed in claim 5 wherein said cross slide includes means for vertically positioning said tool at the level of said main axis.

10. Apparatus as claimtd in claim 9 comprising means supporting said gauge and said means for vertical positioning.

11. Apparatus as claimed in claim 10 comprising means for locking said vertical positioning means.

12. Apparatus as claimed in claim 1 wherein said operating means include a feed screw spindle, a nut on said feed screw spindle secured to said slide for moving the same during rotation of said feed screw by one of said manually operated means, and mounting means for mounting said feed screw spindle including a support for said slide, self-centering ball bearings rotatably supporting said feed screw spindle on said support and having a central ring and a pair of outer centering rings, a pair of clasp nuts threaded onto said screw spindle and pressing from opposite sides against said central ring, and another pair of clasp nuts threaded into said support and pressing from opposite sides against said centering rings.

13. Apparatus as claimed in claim 1 wherein each of said first and second indicating means includes means for setting the same to a position indicating zero; and wherein said transmission means connect said first and second indicating means so that said first indicating means indicates zero or a full unit when said second indicating means indicated zero.

References Cited

UNITED STATES PATENTS

| | | | |
|---|---|---|---|
| 1,127,525 | 2/1915 | Runge | 82—24 |
| 2,672,067 | 3/1954 | Hansell | 82—24 |
| 2,978,920 | 4/1961 | Sears et al. | 82—24X |
| 3,238,630 | 3/1966 | Jeanneret | 82—24X |
| 3,262,347 | 7/1966 | Carroll | 82—24 |

FOREIGN PATENTS

| | | | |
|---|---|---|---|
| 721,536 | 1/1955 | Great Britain | 82—24 |

LEONIDAS VLACHOS, Primary Examiner

U.S. Cl. X.R.

82—1, 34